July 11, 1967  S. GREENBERG ET AL  3,331,014
REGULATED POWER SUPPLIES WITH SELF-COMMUTATING SWITCHING
Filed April 16, 1964

INVENTORS
GEORGE GAUTHERIN
SOL GREENBERG
BY
MORGAN, FINNEGAN, DURHAM & PINE
ATTORNEYS

United States Patent Office 3,331,014
Patented July 11, 1967

3,331,014
REGULATED POWER SUPPLIES WITH SELF-COMMUTATING SWITCHING
Sol Greenberg, Port Washington, and George Gautherin, Woodside, N.Y., assignors to Lambda Electronics Corporation, Huntington, N.Y., a body corporate of New York
Filed Apr. 16, 1964, Ser. No. 360,229
53 Claims. (Cl. 323—22)

ABSTRACT OF THE DISCLOSURE

Switching type electronic power supplies are disclosed herein which utilize cascaded switching circuits employing controlled switches such as controlled rectifiers. The switch circuits are arranged to provide self-commutation and are therefore particularly applicable to switching devices having the characteristics of controlled rectifiers and the like.

---

This invention relates to regulated DC power supplies and more particularly to regulated DC supplies which employ switching techniques in the regulation function.

The employment of switching techniques in regulated DC power supplies offers certain advantages over the use of continuously variable impedance arrangements such as those involving pass transistors. However, these advantages are to an extent offset by a number of control difficulties associated with switching circuits and methods particularly where larger power flow conditions exist.

It is accordingly an object of the invention to eliminate these latter disadvantages in regulated power supplies while at the same time preserving the advantages of switching techniques.

Switching techniques may involve the use of controlled rectifiers and similar elements possessing a latching-type characteristic. Such devices have advantageous power handling characteristics but are frequently burdened by control problems associated, for example, with prompt, positive turn-off when energized from a DC source.

It is accordingly another object of the invention to provide improved techniques for the operation of controlled rectifiers and similar power control devices.

It is frequently desirable to control the level of energy transferred to the output circuit during a particular switching interval in accordance with load requirements. In many cases this is only accomplished at the expense of efficiency and circuit simplicity.

It is thus a further object of the invention to provide efficient and simple means for controlling the level of energy delivered to the load during a switching period.

In addition to the foregoing, it is also an object of the invention to provide control techniques wherein substantially all of the energy available for the load during a particular operating cycle is transferred to the output circuit, before the end of that cycle; hence certain transient response problems are eliminated or reduced. It is also an object of the invention to effect the energy transfer in a substantially lossless manner.

Other objects and advantages of the invention such as general improvements in regulation will be set forth in part hereinafter and in part will be obvious herefrom, or may be learned by practice with the invention, the same being realized and attained by means of the instrumentalities and combinations pointed out in the appended claims.

The invention consists in the novel methods, steps, parts, constructions, arrangements, combinations and improvements herein shown and described.

Serving to illustrate exemplary embodiments of the invention are the drawings of which.

FIGURE 1

Figures 1, 1A:
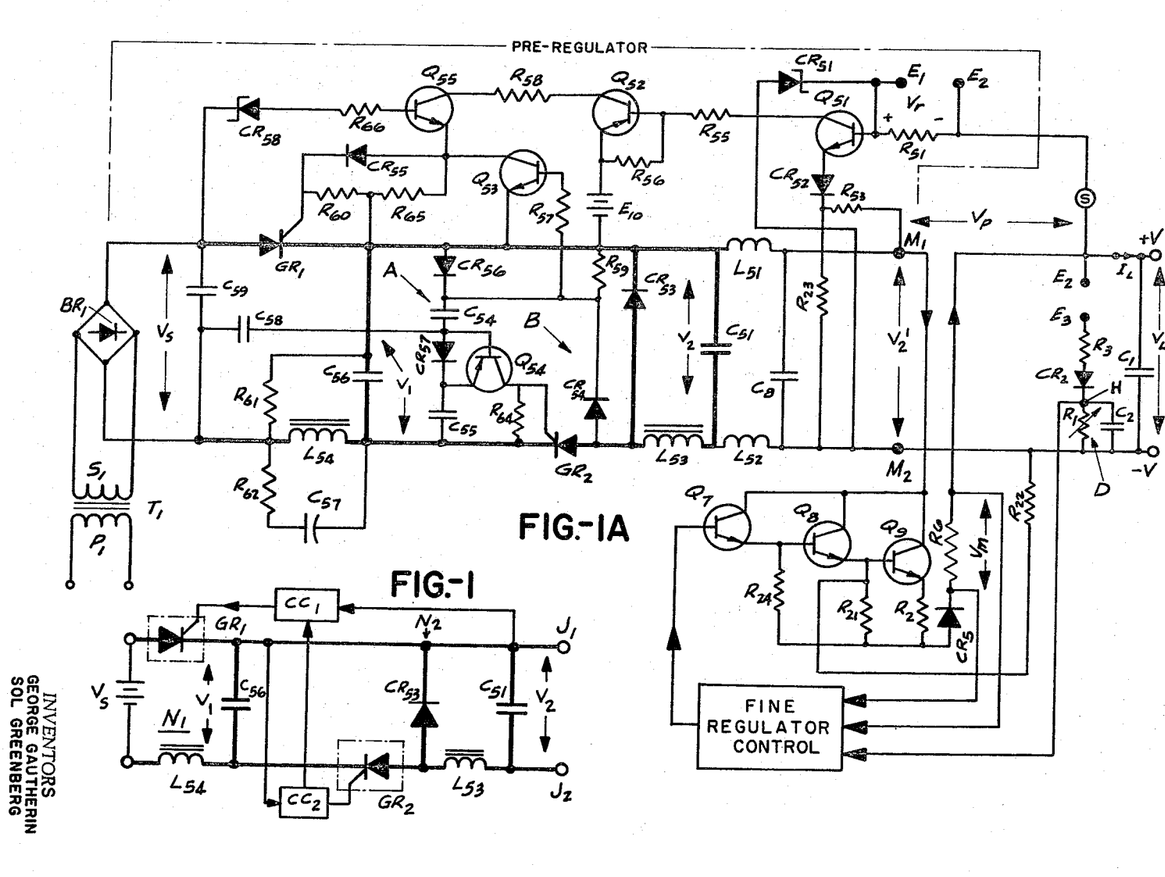
FIGURE 1 is a simplified schematic diagram of one regulated supply according to the invention.
FIGURE 1A is a schematic diagram of a regulated supply embodying aspects of FIGURE 1.

For a general understanding of certain aspects of the invention reference may be had initially to FIGURE 1. As seen therein a source $V_s$ supplies an output $V_2$ at terminals $J_1$, $J_2$ via cascaded power transfer switching circuits $N_1$, $N_2$. As embodied these circuits comprise switching means implemented by controlled rectifiers $GR_1$, $GR_2$, connected in respective oscillatory circuits $C_{56}$, $L_{54}$ and $C_{56}$, $C_{51}$, $L_{53}$. The branch $C_{56}$ is common to both underdamped networks and the latter network $N_2$ includes free wheeling diode $CR_{53}$. In actual practice $V_s$ may be developed across a capacitance which like $C_{51}$, is substantially larger than $C_{56}$.

A drop in output potential $V_2$ triggers $GR_1$ on via control circuit $CC_1$ whereby $C_{56}$ is charged to a voltage $V_1$. The underdamped character of circuit $N_1$ causes $V_1$ to ultimately exceed $V_s$ whereby $GR_1$ is cut off by the self-commutating back bias resulting from this condition.

While $GR_1$ is conducting, rectifier $GR_2$ is locked out of conduction due to interlocking circuit arrangements involving the control circuit $CC_2$ of $GR_2$. Once $GR_1$ cuts off however, a trigger signal is generated in $CC_2$ causing $GR_2$ to be switched on. When this occurs, a circuit connection from $CC_2$ to $CC_1$ disables the latter to lock $GR_1$ out of conduction.

As $GR_2$ conducts it transfers substantially all of the energy stored in $C_{56}$ to the output circuit and specifically to filter $C_{51}$; $V_2$ is thereby increased and restored. When $C_{56}$ is discharged, $GR_2$ cuts off and the circuit is in a condition for a new operating cycle. It may be seen that the transfer of energy impulse occurs in a substantially lossless manner.

For a more detailed description, reference may be had to FIGURE 1A which illustrates FIGURE 1 in a pre-regulator application.

Circuit description—FIGURE 1A

The embodiment of FIGURE 1A comprises a pre-regulator section which is energized via a transformer $T_1$ from the appropriate alternating current source and which supplies an output voltage $V_2'$ at terminals $M_1$, $M_2$ to a fine regulator of the series type. Within the operating load range, the latter delivers at regulated DC output voltage $V_L$ at terminals $+V$, or $-V$ or a regulated output current $I_L$ at these terminals according to the mode of operation. The pre-regulator functions in the illustrated circuits to maintain the voltage $V_p$ across the series control branch of the supply within a prescribed range by introducing appropriate change in $V_2'$.

Referring first to the pre-regulator circuit there is provided power transformer $T_1$ the primary $P_1$ of which is energiezd from the AC power source. Operation is largely independent of source frequency in view of certain characteristics hereinafter described. The secondary $S_1$ supplies voltage to a rectifier illustratively embodied as a bridge $BR_1$. The output of the latter is applied to a filter capacitance $C_{59}$ across which a filtered DC voltage $V_s$ is developed. Preferably $C_{59}$ is sufficiently large, to insure proper source behavior during the switching period hereinafter described.

Connected across filter $C_{59}$ is an underdamped circuit which includes in series configuration switching means embodied as a gated rectifier, $GR_1$, a capacitance $C_{56}$ and an inductance $L_{54}$. The circuit illustratively has a period of approximately 200 microseconds. The voltage $V_s$ supplies a current to the circuit under control of $GR_1$ to charge $C_{56}$ to a voltage $V_1$. The control of $GR_1$ will be described more fully hereinafter. For transient suppression $L_{54}$ in the charging circuit is shunted by the series combination of $R_{62}$ and $C_{57}$; the combination of $L_{54}$ and $C_{56}$ is shunted by a resistance $R_{61}$, which serves to prevent undesired charging of $C_{56}$ during quiescent periods.

The voltage $V_1$ developed across $C_{56}$ is applied in turn to a circuit which includes in series relationship, capacitance $C_{51}$, inductance $L_{53}$ and switch means embodied as a controlled rectifier $GR_2$. This circuit also includes a flyback diode $CR_{53}$ connected across the combination of $L_{53}$ and $C_{51}$. The voltage $V_1$ developed across $C_{56}$ supplies a current to this circuit under the control of $GR_2$ whereby $C_{51}$ is charged to a voltage $V_2$. The capacitance of $C_{51}$ is illustratively of the same magnitude as that of input filter $C_{59}$ and the voltage $V_2$ across $C_{51}$ is applied to a high frequency filter circuit used for spike suppression and comprising in series, inductance $L_{51}$, capacitance $C_8$ and inductance $L_{52}$. Thus filtered, the pre-regulator output voltage $V_2'$ appears across $C_8$ and terminals $M_1$, $M_2$. Voltage $V_2'$ functions as the source voltage for the fine regulator and supplies the output voltage and current $V_L$ and $I_L$ to output terminals $+V$, $-V$ via the emitter-collector of pass transistor $Q_9$ and the serial combination of resistance $R_2$, diode $CR_5$ and resistance $R_6$. The return circuit is from output terminal $-V$ directly to the negative side of $C_8$ (i.e., to $M_2$).

Pass transistor $Q_9$ is controlled as described more fully hereinafter to regulate the output voltage or current in dependence on the desired mode of operation such that the regulated output remains substantially constant. On the other hand the pre-regulator functions to adjust the voltage $V_2'$ to maintain the voltage $V_p$ across the pass transistor $Q_9$ and related elements, within a narrow range. Dissipation and related problems are thereby significantly reduced.

The control of the pre-regulated voltage $V_2'$ as a function of the voltage $V_p$ involves a control circuit which is connected between controlled rectifier $GR_1$ and the fine regulator circuit where $V_p$ is developed. This circuit includes an input control stage $Q_{51}$ comprising an npn transistor having a base connected via a resistance $R_{51}$ and sensing terminal S to output terminal $+V$. A reference voltage $V_r$ is developed across $R_{51}$ via reference current flowing through terminals $E_1$ and $E_2$ of an auxiliary supply which is not shown. The base of $Q_{51}$ is also connected via a zener diode $CR_{51}$ to the $-V$ terminal while the emitter is connected to the collector of pass transistor $Q_9$ via diode $CR_{52}$ and resistance $R_{53}$. The junction of these latter two is connected to $-V$ via a resistor $R_{23}$. Zener diode $CR_{51}$ acts to limit the voltage supplied by the pre-regulator in the event that the output divider of the supply, described hereinafter, is opened. Should this occur, $V_2$ will be limited to the zener voltage of $CR_{51}$. Otherwise, $V_2$ would continue to rise since the voltage $V_r$ applied to $Q_{51}$ would not be offset by $V_p$.

The output of stage $Q_{51}$ is taken from the collector thereof and applied via resistance $R_{55}$ to the base of pnp stage $Q_{52}$. The emitter of this stage is connected to its base via resistance $R_{56}$ and to the positive side of $C_{51}$, i.e., to $+V_2$, via a DC energizing source $E_{10}$. The output of stage $Q_{52}$ is applied via $R_{58}$ to the collector-emitter circuit of an npn stage $Q_{55}$. The emitter of the latter is connected to the gate electrode of $GR_1$ via a diode $CR_{55}$ and, in parallel therewith, serially connected resistances $R_{65}$ and $R_{60}$. The junction of the resistances is connected to the positive side of $C_{56}$ which is also the point connected to $+V_1$ and $+V_2$. The base of $Q_{55}$ is connected to the positive terminal of $C_{59}$, i.e., to $+V_s$, via the series combination of resistance $R_{66}$ and zener diode $CR_{58}$.

Serving as means for diverting control current from flowing under certain conditions between $Q_{55}$ and the gate of $GR_1$ is an npn stage of $Q_{53}$. The collector of this stage is connected to the emitter of $Q_{55}$ while its emitter is connected to the points $+V_1$ and $+V_2$. The base is connected via resistance $R_{57}$ to two points. The first point is the junction of a diode $CR_{56}$ and a capacitance $C_{54}$ in a branch A which is connected across $C_{56}$ and is therefore energized by $V_1$. This branch also includes, in series with $CR_{56}$ and $CR_{54}$, the serially connected elements $CR_{57}$ and $C_{55}$. The second point to which $R_{57}$ in the base of $Q_{53}$ is connected, is the junction of resistance $R_{59}$ and diode $CR_{54}$ serially connected as a branch B across flyback diode $CR_{53}$.

Controlling the conduction of $GR_2$ is a pnp stage $Q_{54}$ having its collector connected to the gate of $GR_2$. The collector is also connected via resistance $R_{64}$ which is between the gate and cathode of $GR_2$ to the minus terminal of $C_{56}$, i.e., to $V_1-$. The base of $Q_{54}$ is connected to the junction of $C_{54}$ and $CR_{57}$ in branch A. This point is also connected to the minus side of $C_{59}$ via a capacitance $C_{58}$. The emitter of $Q_{54}$ is connected to the junction of $CR_{57}$ and $C_{55}$, in branch A whereby the emitter-base circuit is connected across $CR_{57}$.

The fine regulator arrangement comprises the voltage and current regulating type with automatic cross over. It includes a fine regulator control system of known configuration which receives a voltage related to output voltage by way of connection to a point H of an output divider D. The divider is in parallel with an output filter $C_1$ and is connected between the output terminals $+V$ and $-V$. The divider comprises the serial combination of a voltage source $E_2$-$E_3$ derived from the auxiliary supply, a resistance $R_3$, a diode $CR_2$ and an adjustable resistance $R_1$. The point H comprises the junction of $CR_2$ and $R_1$. The regulator also receives as an output a voltage $V_m$ dropped across resistance $R_6$. This voltage is related to the magnitude of load current.

The output of the fine regulator control circuit depends on the monitored load voltage and current, and supplies the requisite control signal to the base of an npn driver stage $Q_7$. The collector thereof is connected to the collectors of a further npn driver $Q_8$ and npn pass transistor $Q_9$. The emitter of $Q_7$ is connected to the base of $Q_8$ and, via $R_{24}$, to the junction of $R_2$ and $CR_5$. Driver $Q_8$ has its emitter connected to the base of $Q_9$. The emitter of $Q_8$ is also connected via $R_{21}$ to the junction of $R_2$ and $CR_5$ and also to the $-V$ terminal via resistance $R_{22}$.

Operation—FIGURE 1A

Operation of the pre-regulator of FIGURE 1 is based on a variable pulse rate in which the conduction period of $GR_1$ is relatively fixed and independent of load conditions, depending instead largely on the LC values in the anode-cathode circuit thereof. On the other hand, the interval between current pulses, or in other words the pulse repetition frequency (PRF), varies in accordance with load requirements. Generally, the PRF will vary directly with both output voltage and output current, $V_2'$ and $I_2$, and inversely relative to a line voltage function. The operating cycle may be generally regarded as the sequence in which $GR_1$ fires, delivers a charge to $C_{56}$ and then extinguishes; $GR_2$ then fires, transfers energy from $C_{56}$ to the filter circuit and extinguishes. A period of flyback, followed by a rest period may then ensue. This operating or duty cycle is repeated at the required repetition frequency. In addition, the two controlled rectifiers are interlocked or synchronized so that they do not conduct concurrently.

For a given line voltage, the energy transferred per cycle by $GR_1$ will generally be fixed. The transferred energy is transferred in turn by $GR_2$ to the LC circuit including $C_{51}$, $L_{53}$ and flyback diode $CR_{53}$, where it is filtered to provide $V_2$. $C_{51}$ and $L_{53}$ constitute a resonant circuit which is illustratively resonant at about the same frequency as that applicable to the circuit of $GR_1$. The rectifier $GR_2$ is, like $GR_1$, preferably a silicon controlled type and as noted above is slaved or synchronized to the operation of $GR_1$ as described more fully below.

The filter capacitance $C_{51}$ plays a role in the cut-off of $GR_2$ while the underdamped LC characteristic of the circuit of $GR_1$ causes the cut-off of this latter rectifier since $V_1$ will ultimately exceed $V_s$ to provide a back bias condition and reverse current enabling rapid positive turn off of $GR_1$. The oscillatory charcater of the circuit also facilitates a flow back feature described hereinafter in connection with FIGURES 3, 4 and 5. The interposition of $GR_2$ between $GR_1$ and the output serves to controllably isolate the oscillatory circuit of $GR_1$, from the load. The automatic cut off of $GR_1$ is thus insured over a wide range of load conditions. It may be noted that $L_{53}$ serves both to reduce losses otherwise occurring in the transfer of energy from $C_{56}$ to $C_{51}$ and to permit full discharge of $C_{56}$.

Turn-on of $GR_1$ depends upon the receipt of a switching signal at its gate electrode. This signal is embodied as a current flow out of the collector of $Q_{52}$. However, for this current to flow in the controlled rectifier gate circuit, it is necessary that $Q_{55}$ be conductive such that switching current may flow through the collector-emitter circuit thereof. Furthermore, it is necessary that stage $Q_{53}$ be substantially non-conductive since its emitter-collector circuit shunts the gate circuit and if conductive would divert the switching signal therefrom. Initially it is assumed that these two conditions obtain, i.e., that $Q_{55}$ is conductive and $Q_{53}$ non-conductive.

Rectifier $GR_1$ is gated on as a function of the value of voltage $V_p$ dropped across the output series control elements, viz., $Q_9$, $CR_5$ and $R_6$. This voltage is compared with the reference voltage $V_r$ and the resultant applied to the emitter-base circuit of $Q_{51}$. With $V_p$ equal to or greater than the required value, the error detector $Q_{51}$ is biased to the off state. When $V_p$ drops below this value, base current flows to switch $Q_{51}$ to the conductive state. From source $E_{10}$ current thus flows through the emitter-base circuit of $Q_{52}$ to the now-conductive collector of $Q_{51}$ via $R_{55}$. Stage $Q_{52}$ is thereby also switched on. Under the assumed conditions, current flows from source $E_{10}$ through the emitter-collector circuits of $Q_{52}$ and $Q_{55}$, and through $CR_{55}$ to the gate-cathode circuit of $GR_1$ which is returned to the negative side of $E_{10}$. The anode-cathode circuit of $GR_1$ is thereby rendered conductive.

Being switched on, $GR_1$ delivers current from source $V_s$ to capacitance $C_{56}$, charging the latter via $L_{54}$. The underdamped LC characteristic of the charging circuit causes the current to rise sinusoidally to a maximum value, and then to decrease to zero and reverse. As the direction of current flow reverses, current is forced through $GR_1$ in reverse direction causing it to cut-off. Current flow in $GR_1$ then terminates. The charge delivered to $C_{56}$ results in a voltage $V_1$ which is larger than $V_s$.

During the transient initial equipment turn-on, $GR_1$ may conduct prematurely, i.e., before $V_s$ has been established. Should this occur, automatic commutation of $GR_1$ may be prevented since with $GR_1$ already conductive, the rise of $V_s$ does not cause the required switching transient. Lacking this transient, $GR_1$ will not cut-off in the desired manner because $V_1$ will not exceed $V_s$. To eliminate this possibility the stage employing $Q_{55}$ and zener diode $CR_{58}$ is connected to the gate control circuit and the output side of $GR_1$ and to the source $V_s$. Until $V_s$ reaches a predetermined minimum value, zener diode $CR_{58}$ will not conduct. Hence $Q_{55}$ will be cut-off and gate current to the controlled rectifier blocked. When $V_s$ attains the minimum value, $CR_{58}$ fires and current flows from $V_s+$ through $CR_{58}$, $R_{66}$, the emitter-base of $Q_{55}$ and through the circuit comprising the emitter-collector of $Q_{53}$ to $V_s-$. $Q_{55}$ is thus switched on to allow gate current to flow in $GR_1$ as required. The combination of $R_{65}$, $R_{60}$ and $CR_{55}$ is interposed in the gate circuit of $GR_1$ to prevent base current of $Q_{55}$ from inadvertently causing turn on of $GR_1$. Once $GR_1$ is switched on, conditions in the gate circuit no longer effect conduction.

During the conduction period of $GR_1$, when current is being delivered to $C_{56}$, an additional current flows in the branch A thereby charging $C_{54}$ and $C_{55}$. The voltage thereby developed across $C_{54}$ is a relatively large percentage of $V_1$ while the voltage across $C_{55}$ is considerably smaller, e.g., a few volts. A potential drop across $CR_{57}$ in branch A back-biases stage $Q_{54}$ whereby $Q_{54}$ is maintained in its off state to thereby prevent gate current flow to $GR_2$ during the conduction of $GR_1$.

During the conduction period of $GR_1$ a current is delivered to $C_{58}$. The resultant voltage across $C_{58}$ reverses polarity accordingly as the drop across $L_{54}$ reverses polarity, i.e., after current through $L_{54}$ passes its peak value. This follows because the drop across $C_{55}$ is relatively small compared with the voltage across $L_{54}$. Therefore, the voltage across $C_{58}$ roughly approximates the voltage across $L_{54}$. At polarity reversal the resultant voltage across $C_{58}$ is then relatively negative on the side which connects to the base of $Q_{54}$. When conduction through $GR_1$ terminates, current through branch A falls off so that the drop across $CR_{57}$ decreases. Hence a point will be reached where $Q_{54}$ is no longer back-biased. Also at this time the voltage across $L_{54}$ has dropped to zero; $C_{58}$ therefore discharges, delivering a current via $L_{54}$ and $C_{55}$ to the emitter-base circuit and causing $Q_{54}$ to become conductive. When this occurs, the charge on $C_{55}$ causes a current flow in the gate of $GR_2$ via the emitter-collector of $Q_{54}$. Hence $GR_2$ is triggered on. When this occurs current is delivered from $C_{56}$ to the LC circuit including filter $C_{51}$, $L_{53}$, producing a rising voltage $V_2$ across $C_{51}$. After further filtering of high frequency transients via $L_{51}$, $C_8$ and $L_{52}$, a resultant rising voltage $V_2$ is provided across the pre-regulator output terminals $M_1$, $M_2$.

As $GR_2$ transfers charge from $C_{56}$ to the output, the voltage $V_1$ falls and approaches $V_2$. When $V_1$ equals $V_2$, the current through $GR_2$ is at its maximum and thereafter commences to decrease; the polarity of the voltage across $L_{53}$ reverses at this time, and when $V_1$ equals zero, $L_{53}$ acts as a source (flyback), delivering the balance of stored energy to $C_{51}$ via $CR_{53}$. It may be seen that $C_{56}$ has been fully discharged, transferring all of its energy to $C_{51}$.

Upon termination of flyback, and if $GR_2$ has not already extinguished due to the absence of current therethrough in the forward direction, a reverse current from $C_{51}$ flowing serially through $C_{56}$, $GR_2$ and $L_{53}$, will insure $GR_2$ turn-off.

During the conduction period of $GR_2$, there is no appreciable voltage across $CR_{56}$ since $GR_1$ is cut off. Under this condition the voltage across $C_{54}$ supplies a turn on current to base-emitter circuit of $Q_{53}$, via $R_{57}$, $C_{51}$, $L_{53}$, $GR_2$, $C_{55}$ and the emitter-base circuit of $Q_{54}$. $Q_{53}$ is thus rendered conductive and acts to shunt gate current away from $GR_1$, preventing energization of the latter. When $C_{54}$ fully discharges, $Q_{53}$ is deenergized whereby $GR_1$ is conditioned to receive gate signals.

If the result of the foregoing switching actions is to cause a sufficient increase in $V_2'$ that such $V_p$ attains its minimum value, then gate signals to $GR_1$ will terminate until such time as $V_p$ again falls below the minimum value. When this occurs, the cycle is repeated. As noted hereinbefore, the pulse repetition frequency varies in direct relation to $V_2'$ and $I_2$ and inversely as a function of a line voltage factor.

In addition to facilitating cut off of $GR_1$, the LC characteristic of the circuit controlled by this rectifier, together with the fixed conduction period associated with this LC characteristic, results in a minimization of losses in $GR_1$ during turn-on and turn-off thus permitting smaller, less costly units. Note that currents are virtually zero during turn-on and turn-off of both controlled rectifiers.

A typical supply embodying the circuit of FIGURE 1 may provide a variable regulated output voltage in the range of 0–36 volts and a variable regulated current in the range 0–4 amperes. The fine regulator control system also includes a switching transistor not explicitly shown which is responsive to the voltage $V_m$ and causes appropriate circuit changes to transfer the fine regulator arrangement between the constant voltage and constant current modes according to whether load current is below or above a set value. In either mode, the fine regulator functions to vary automatically the impedance of $Q_9$ and thus controls the output in accordance with sensed departures in the output.

For certain applications, the pre-regulator provides sufficient regulation per se to permit elimination of the fine regulator.

In many supplies employing averaging chokes, the switching of the load circuit *on* and *off* produces transients at the output terminals which are some times objectionable. In the embodiment of FIGURE 1, however, the inductance $L_{53}$ is not required to be large enough to provide an averaging function. Rather it has a value which reduces losses otherwise occurring in the transfer of energy from $C_{56}$ to $C_{51}$. The value of $L_{53}$ is also such as to permit the total discharge of $C_{56}$ in the appropriate time interval and to facilitate the cut off of $GR_2$. Compared with an averaging choke, $L_{53}$ can be of relatively small inductance whereby switching transients as described above are significantly reduced.

FIGURE 2

Figure 2:
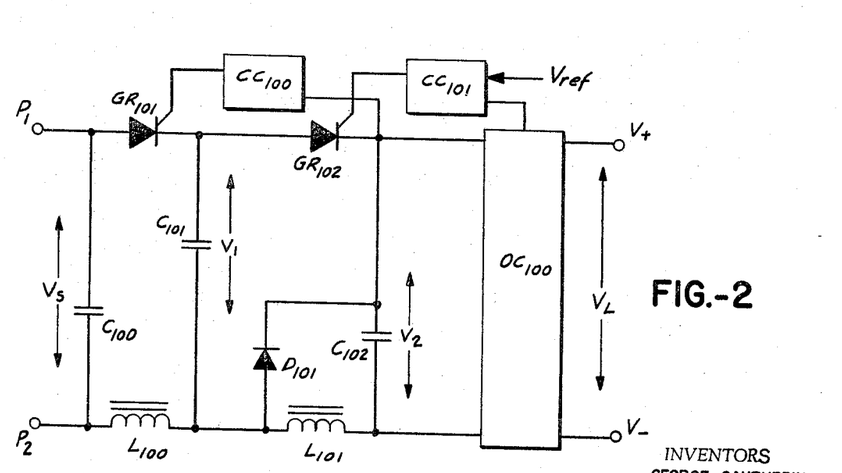
FIGURE 2 is a schematic diagram of a second embodiment employing an alternate control arrangement.

In the embodiment of FIGURE 2 a DC source $V_s$ is developed across terminals $P_1$ and $P_2$ with the aid of filtering capacitance $C_{100}$. Serially connected across $C_{100}$ is the combination including controlled rectifier $GR_{101}$, capacitance $C_{101}$ and inductance $L_{100}$. This combination forms an underdamped LC circuit. During the conduction of $GR_{101}$, as described more fully hereinafter, a charge is delivered to $C_{101}$ whereby a voltage $V_1$ is developed across this capacitor. As in the manner hereinbefore described, current in the loop ultimately reverses causing the cut-off of $GR_{101}$.

The voltage $V_1$, which has a peak value approaching twice the value of $V_s$, is applied in turn to a second circuit comprising controlled rectifier $GR_{102}$, capacitance $C_{102}$ and inductance $L_{101}$.

When $GR_{102}$ is switched on, current is delivered from source $V_1$ to capacitance $C_{102}$ via $L_{101}$. As a consequence, a voltage $V_2$ is developed across $C_{102}$ and this voltage after further filtering and perhaps additional regulation in output circuit $OC_{100}$, appears across output terminals $V+$ and $V-$.

For regulating the output voltage, a control circuit $CC_{101}$ is provided which is connected between the output circuit and the gate-cathode circuit of $GR_{102}$. It may thus be seen that the feedback control function involves the second controlled rectifier rather than the first as in the previously described embodiment.

For controlling $GR_{101}$ in proper synchronism with $GR_{102}$ and to insure that the conduction times of the two rectifiers do not overlap, an additional control circuit $CC_{100}$ is provided. This circuit is connected to the gate-cathode circuit of $GR_{101}$.

In view of the detailed description of the embodiment of FIGURE 1, certain circuit details respecting the arrangement of FIGURE 2 have been omitted as they are similar to those employed in FIGURE 1. Thus, for example, a zener diode or other voltage responsive component may be connected between the source $V_s$ and the gate-cathode circuit of $GR_{101}$ to prevent premature operation of the rectifier.

In operation, a drop in output potential below the controlled value causes a gate current to be supplied to $GR_{102}$ via $CC_{101}$. This control circuit may be similar to the corresponding circuit of FIGURE 1. The rectifier is thereby energized and transfers energy from $C_{101}$ to $C_{102}$ and the output circuit. The voltage $V_2$ and the resultant output voltage $V_L$ accordingly rise while the voltage $V_1$ across $C_{101}$ decreases toward zero. During the discharge of $C_{101}$, a flyback action commences with $C_{102}$ being charged from inductance $L_{101}$ via flyback diode $D_{101}$. The flyback action and/or the collapsing of voltage $V_1$ ultimately causes $GR_{102}$ to extinguish. The action of switching off causes, in turn, the application of gate current to $GR_{101}$ via the control circuit $CC_{100}$. Hence, when $GR_{102}$ extinguishes, $GR_{101}$ fires. Conduction of the latter recharges $C_{101}$ from $C_{100}$. As the charging action continues, current through $GR_{101}$ reverses causing the same to cut off. Voltage $V_1$ is now restored and available to supply the output when it is again required.

FIGURE 3

In the embodiments thus far described the amount of energy transferred per cycle is relatively fixed and does not vary as a function of load requirements. For low load power conditions at low load voltage, the repetition rate of the supply is low and there is a tendency during each energy transfer period to overcorrect. The ripple amplitude is therefore relatively high.

To reduce the ripple amplitude, and provide improved control performance, it is desirable in certain applications to adjust the amount of energy transfer during each conduction period in accordance with load requirements. This has the effect of raising the low frequency limit of the repetition rate and reducing ripple.

In controlling the amount of energy transferred per cycle, it would be preferable to transfer an amount which was comparable to that required by the load. The rest time would therefore be short and the operating frequency relatively high. To accomplish this function, it would appear to be necessary to sample the energy transfer operation and to sample load power requirements so that the transfer of energy can be regulated. It would also appear that power dissipation problems might be engendered in view of the need to divert power not required from the output circuit.

While the foregoing requirements would appear to create the need for circuits having a good deal of complexity, it has been found that these functions can be achieved to a satisfactory approximation in a simple manner with simple circuit configurations. This simplification is based in part on the ability of the oscillatory input circuit to undergo a condition of current flow-back to the source and further, on the realization that the voltage across the capacitance charged by the first SCR provides to a close approximation an indication of the magnitude of energy available for transfer, i.e., the energy stored in C and L. This voltage represents the instantaneous energy level available for transfer to load. To sample load power requirements, it is assumed that one of the output quantities is fixed, e.g., output current; it is preferred that the system be designed on the basis of maximum load current.

If it is assumed that output current is maximum, then load requirements will vary with output voltage and this output voltage can thus be sampled to serve as a measure of load power requirements. By comparing this sampled voltage with a signal related to the voltage across the storage capacitance, then appropriate control actions can be initiated to provide only the required amount of energy transfer from this storage capacitance to the output filter circuit via the second controlled rectifier, provided means are available for practically varying the energy level in the storage circuit. It has been found that such means are available through the technique of diverting the excessive energy, not to a dissipative circuit, but rather back to the source. This is especially feasible in view of the oscillatory character of the input controlled rectifier circuit when $V_1$ exceeds $V_s$ this return current occurs. By means of flow back this energy control can be accomplished effectively and without the normal attendant dissipation. It may be seen in substance that the only power drawn from the mains is that actually required by the load (plus internal losses) whereby relatively high efficiency is attained.

Figure 3:
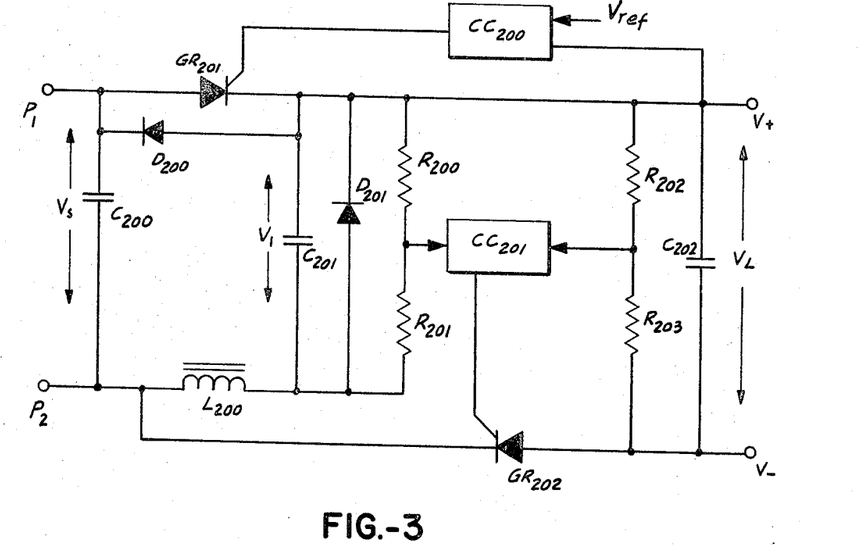
FIGURE 3 is a schematic diagram of a third embodiment.
Figure 4:
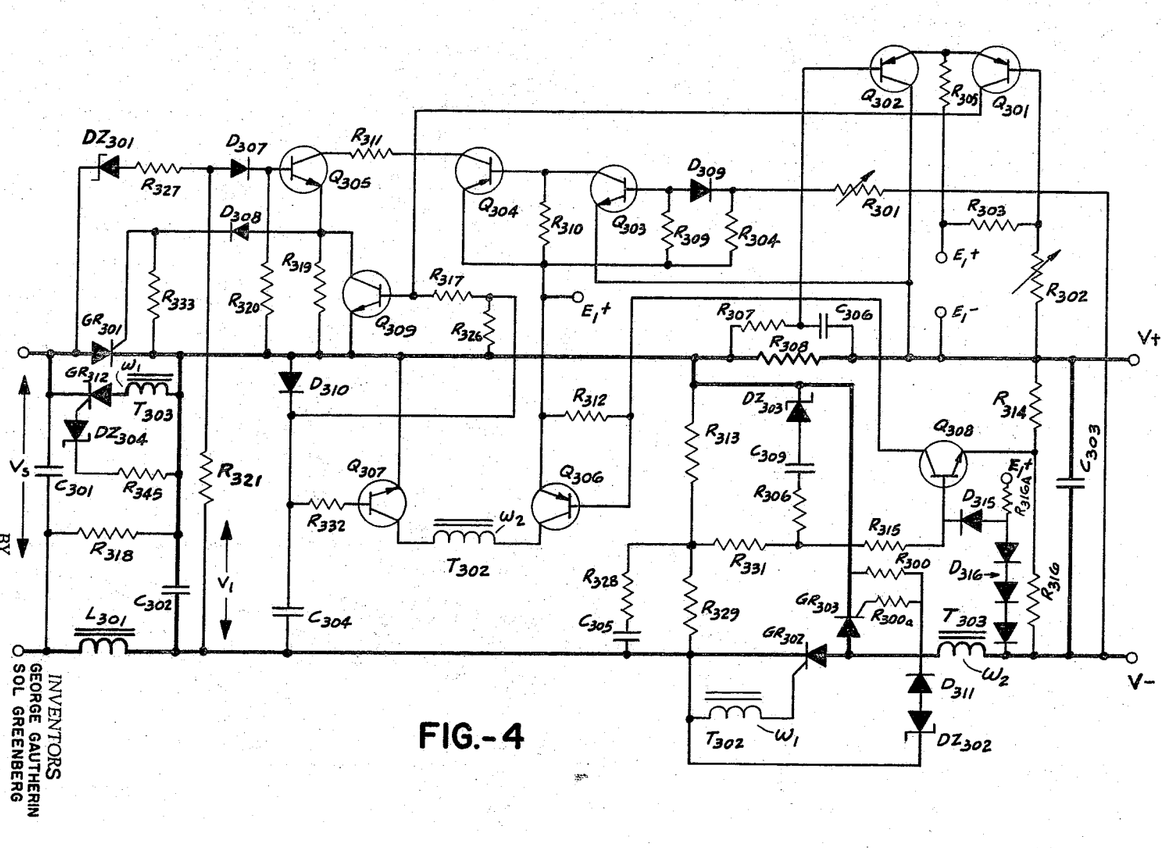
FIGURE 4 is a schematic diagram of a fourth embodiment including some of the control features characterizing FIGURE 3.
Figure 5:
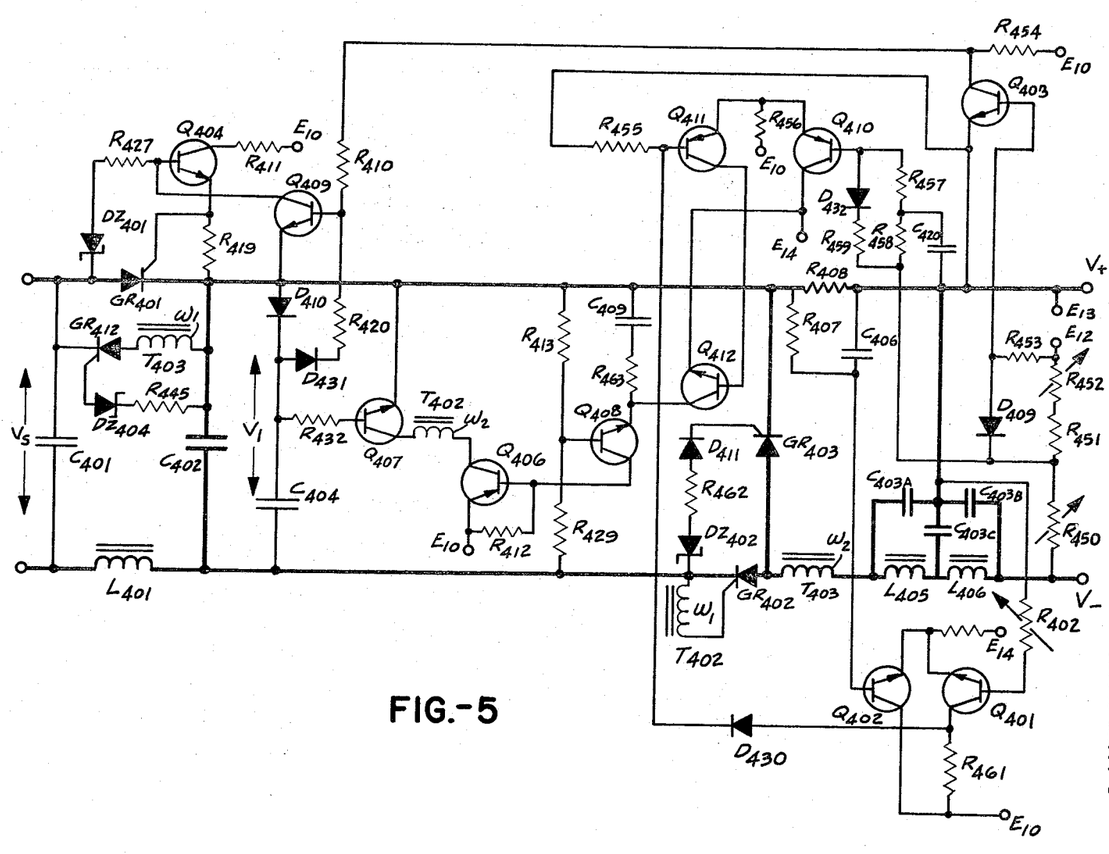
FIGURE 5 is a schematic diagram of a fifth embodiment.

The foregoing concepts are embodied in the circuits of FIGURES 3, 4 and 5.

In the circuit of FIGURE 3 the DC source $V_s$ appearing across $C_{200}$ is applied to an underdamped LC circuit comprising in series, controlled rectifier $GR_{201}$, a capacitance $C_{201}$ and an inductance $L_{200}$. When $GR_{201}$ is energized due to a drop in output voltage, current is supplied from the source $V_s$ to $C_{201}$. The voltage $V_1$ across $C_{201}$ thus increases as $GR_{201}$ continues to conduct.

Connected across $C_{201}$ is a divider comprising resistances $R_{200}$ and $R_{201}$, serially connected. To the junction of these resistances is connected a control circuit $CC_{201}$. This circuit thus samples the voltage $V_1$. The control circuit also samples a signal which is a function of the output voltage. This is derived by way of connection to a divider across the output terminals $V+$ and $V-$ comprising the serial combination of $R_{202}$ and $R_{203}$. The control circuit is also connected to the junction of these two resistances thereby also sampling output voltage. As the forward current through $GR_{201}$ terminates, $V_1$ reaches its peak value and thereafter commences to decrease. At the same time the current flow in the LC circuit reverses direction so that $C_{201}$ is now delivering current back to the source $V_s$. This reversed current cuts off $GR_{201}$ and thereafter flows in a diode $D_{200}$ which shunts $GR_{201}$. As the reverse current continues to flow, the amplitude of $V_1$ decreases. When $V_1$ decreases below $V_s$, inductance $L_{200}$ continues the reverse current flow through $D_{200}$; $C_{201}$ continues to discharge.

As $V_1$ decreases from the peak, it reaches the value representing the amount of energy required for the sampled load conditions, at which time the control circuit $CC_{201}$ supplies a gate signal to $GR_{202}$. The latter has its anode-cathode circuit connected from the output terminal $V-$ to input terminal $P_2$. The charge on $C_{201}$ as well as the energy stored in $L_{200}$ is thereafter delivered to the output terminals. This charge flows through $GR_{202}$ and through $L_{200}$. As $V_1$ falls below $V_L$, flyback action is provided by $L_{200}$. When $V_1$ falls to zero and reverses polarity, $D_{201}$ becomes conductive and passes any additional current available from $L_{200}$ to the output. $GR_{202}$ cuts off when $L_{200}$ is discharged. It may be seen that current is delivered to the output circuit in the period following the peak of $V_1$.

It should also be noted that when $GR_{202}$ is switched on, and provided that $V_L$ is less than $V_s$, then there is an automatic cessation of flowback since diode $D_{200}$ is now back biased.

In the operation of the circuit of FIGURE 3, the sampling action assumes that one of the output parameters is fixed (e.g., voltage) while the other varies. In actual practice the sampling relationship is based on maximum load current parameter. Under these conditions the firing time of $GR_{202}$ will vary as a function of load voltage, the amount of energy returned to the source being automatically adjusted as load voltage variations are sensed. Hence under these conditions the operating frequency of the supply tends to be constant while the output pulse amplitude varies as required. When load current varies from its maximum value the operating frequency varies to provide the requisite compensation automatically and it may be noted that this characteristic provides inherent current limiting. No matter what value of output voltage exists, the operating frequency can only increase to some maximum value and no further as load current increases. No additional load current can be drawn from the supply beyond that permitted by the maximum frequency of operation.

FIGURE 4

The circuit of FIGURE 4 includes circuit interconnections allowing the return of switched energy to the source whereby energy in controllable amounts is delivered to the load as is the case with respect to FIGURE 3. Other operating characteristics and features will be apparent in the following description.

The input to the circuit of FIGURE 4 comprises a DC voltage $V_s$ which is applied across capacitance $C_{301}$. This source is subjected to a first controlled switching action provided by a controlled rectifier $GR_{301}$. The latter is in series circuit arrangement with capacitance $C_{302}$ and inductance $L_{301}$, the combination being connected across $C_{301}$ of source $V_s$. With $GR_{301}$ switched on, current is delivered from $C_{301}$ to $C_{302}$ via $GR_{301}$ and $L_{301}$. The voltage $V_1$ across $C_{302}$ thus rises. As in the case of the previously described LC circuits, the current flow through $GR_{301}$ rises to a maximum, decreases to zero and then reverses. When reverse current flows, it cuts off $GR_{301}$ but nevertheless continues to flow back to the source $V_s$ via an alternate path shunting $GR_{301}$ and comprising, in series, winding $W_1$ of transformer $T_{303}$ and controlled rectifier $GR_{312}$.

As energy is transferred back to the source, the voltage $V_1$ decreases. By means described more fully hereinafter, this voltage, which indicates or reflects the energy level, is compared with the output voltage across output terminals $V+$ and $V-$. When the two voltages are in the proper relationship, controlled rectifier $GR_{302}$ is switched on. At this time the energies stored in both $C_{302}$ and the core of $T_{303}$ are transferred to the output terminals by way of the second controlled rectifier circuit connected across $C_{302}$ and comprising current sensing resistance $R_{308}$, the output terminals $V+$ and $V-$, secondary winding $W_2$ of $T_{303}$ and controlled rectifier $GR_{302}$. Included in this circuit and connected across the output terminals is a filter $C_{303}$. As a result of this second switching action, the proper amount of correcting energy is delivered to the output circuit as described in connection with FIGURE 3. When $V_1$ drops below $V$, flyback action commences. During this period $C_{302}$ is fully discharged and the energy stored in the core of $T_{303}$ is delivered to the output circuit first, via $C_{302}$ and then via the flyback controlled rectifier $GR_{303}$. The latter element is switched on and off by means described more fully hereinafter.

When the voltage $V_1$ across $C_{302}$ passes through zero and reverses, a point is reached where $GR_{303}$, the flyback diode, is turned on. Note the branch comprising $D_{z302}$, $D_{311}$, $R_{300a}$, and the gate cathode of $GR_{303}$ is effectively energized by $V_1$. When $GR_{303}$ is switched on, the reversed polarity voltage $V_1$ across $C_{302}$ now drives reverse current through $GR_{302}$, causing it to cut off. Flyback continues until the core energy of $T_{303}$ is transferred to the load. The system is then in readiness for a new operating cycle when output voltage falls below its required value. The means for accomplishing this is described below. (Note that in this system, the cut off of $GR_{302}$ during flyback enables the turn on of $GR_{301}$ during this same interval; hence greater power output is realized.)

Forming a branch of series elements across the output terminals is a circuit comprising, from terminal $V-$, a variable resistance $R_{301}$, resistance $R_{304}$, and an auxiliary voltage applied at terminals $E_{1+}$, $E_{1-}$. The latter terminal is connected to $V+$. This series circuit functions to sense output voltage and there is connected thereto an error detector stage comprising npn transistor $Q_{303}$. The base of this stage is connected to the junction of $R_{304}$ and $R_{301}$ via diode $D_{309}$ and to the junction of $R_{304}$ and $E_{1+}$ via a resistance $R_{309}$. The emitter is connected directly to $E_{1-}$ and thus also to $V+$. Variations in output potential effect the emitter-base voltage of $Q_{303}$, provided that they are in the direction and of a sufficient magnitude whereby $Q_{303}$ is switched to the conductive state and collector current flows therein from $E_{1+}$ through $R_{310}$, through the collector and emitter, to $E_{1-}$. This current flows when the output voltage falls below the reference value and includes a component flowing from $E_{1+}$ through the emitter-base circuit of $Q_{304}$; the latter is thus also switched *on*. When $Q_{304}$ becomes conductive, current flows through the emitter-collector circuit thereof and through the collector-emitter circuit of $Q_{305}$ via $R_{311}$, provided $Q_{305}$ is conductive. As in earlier embodiments, this stage becomes conductive when voltage $V_s$ exceeds $V_1$ by a sufficient amount. Under this condition zener diode $DZ_{301}$ is energized and base-emitter current flows from the positive terminal of $V_s$ through $DZ_{301}$, through $R_{327}$ and diode $D_{307}$, and through the base-emitter circuit of $Q_{305}$. With $Q_{305}$ conductive the collector current from $Q_{304}$ flows therein and thence to the gate of switching rectifier $GR_{301}$ via diode $D_{308}$. However, current otherwise flowing to the gate will be diverted therefrom and shunted through the collector-emitter circuit of stage $Q_{309}$ should the latter be conductive. For present purposes it is assumed that $Q_{309}$ is cut off whereby the control current is delivered to the gate of $GR_{301}$ to switch it *on*. With $GR_{301}$ conductive the cycle previously described occurs; the voltage $V_1$ rises and then commences to decay as the excessive energy not required by the load is returned to the source through $GR_{312}$ and $W_1$ of $T_{303}$. As the current in the LC circuit reverses, $GR_{301}$ is automatically cut off. $V_1$ is at its peak value.

As the voltage $V_1$ across $C_{302}$ decreases, a point is reached wherein the residual voltage on $C_{302}$ indicates that the residual circuit energy is the amount required to correct the output of the supply as hereinbefore described. To detect this point, the voltage $V_1$ is sampled by a branch comprising resistances $R_{313}$ and $R_{329}$. The junction of these resistors is connected, via serially connected resistors $R_{331}$ and $R_{315}$, to the base of an npn stage $Q_{308}$. The emitter of $Q_{308}$ is connected to sample output voltage by way of connection to a divider comprising resistors $R_{314}$ and $R_{316}$ in series across output terminals V+ and V−. When $V_1$ reaches the required value relative to the output voltage, the base of $Q_{308}$ is forward biased relative to the emitter and the stage conducts. The collector thereof is connected to the base of a pnp stage $Q_{306}$ and via $R_{312}$ to the emitter and to $E_{1+}$ so that conduction of $Q_{308}$ causes conduction of $Q_{306}$. Current thereby flows from $E_{1+}$ through the emitter-collector of $Q_{306}$, through a winding $W_2$ of transformer $T_{302}$, and through the collector-emitter circuit of an npn stage $Q_{307}$ provided the latter is conductive. During the initial charging of $V_1$ to its peak value, capacitor $C_{304}$ in branch $D_{310}$, $C_{304}$ across $V_1$, charges to a comparable value via the diode $D_{310}$. When $V_1$ commences to decrease the conduction through $D_{310}$ ceases. At this time the back-biasing of $Q_{307}$, otherwise provided by the forward drop across $D_{310}$, disappears and base current is supplied to $Q_{307}$ from $C_{304}$ via $R_{332}$. Hence, stage $Q_{307}$ is switched *on* following the peak of $V_1$ and is conductive under the stated condition in which voltage $V_1$ has dropped to a value representing the amount of residual energy to be transferred to the load. Thus when $Q_{308}$ is switched on as previously described, current will flow through $W_2$ of $T_{302}$ and through the collector-emitter of $Q_{307}$. This current pulse in the primary of $T_{302}$, induces a voltage in $W_1$ of $T_{302}$, which voltage triggers rectifier $GR_{302}$. There follows the second part of the operating cycle previously described.

It may be seen that while $GR_{301}$ is turned on in accordance with the output voltage comparison to a reference, the rectifier $GR_{302}$ is turned on as a function of load power parameters as determined by a comparison of $V_1$ and the output voltage. As in the case of FIGURE 3, variations in output current vary the repetition rate of the supply for a given voltage, while the firing point of $GR_{302}$ for a given input $V_s$ remains substantially fixed provided output voltage remains unchanged.

To faciiltate the transfer of core energy to the output circuit, winding $W_1$ of $T_{303}$ is connected in the return or flowback path, which includes $GR_{312}$ while the secondary winding $W_2$ is connected in the output circuit. Preferably, the inductance of $W_1$ of $T_{303}$ is made larger than that of $L_{301}$, and when $GR_{302}$ is switched on the energy stored in $W_1$, which is the major inductive component, is transformed to the output circuit via winding $W_2$ which is connected between output terminal V− and the anode $GR_{302}$.

As return or flowback current flows through $GR_{312}$ and winding $W_1$ of $T_{303}$, the point is reached where the slope of current reverses. When this occurs a voltage is induced in $W_2$ of $T_{303}$ which has a polarity capable of causing current to be delivered to the output terminals from winding $W_2$ via flyback rectifier $GR_{303}$. To prevent this premature delivery of output current, the flyback rectifier is embodied as a controlled rectifier which is rendered conductive only when $V_1$ has passed through zero and attained a negative value sufficient to cause breakdown of zener diode $DZ_{302}$. In this event, and as noted above, current flows through the gate-cathode circuit of $GR_{303}$ via the zener diode, diode $D_{311}$ and resistor $R_{300a}$. Hence, energy transfer is prevented except during the desired transfer interval.

Control action for the switching of $GR_{302}$ involves the sampling of voltage $V_1$ under the assumption that this voltage is indicative of the energy stored in $C_{302}$, $L_{301}$ and $T_{303}$. However, losses in the LC circuit cause a departure from this assumption. To provide correction a compensating network comprising resistor $R_{328}$ and capacitance $C_{305}$ is connected across $R_{329}$ in the divider which samples $V_1$.

Under certain low voltage conditions, maintenance of the supply output may require additional energy from $V_s$ during the flyback interval. Instead of maintaining $GR_{301}$ cut off until the end of the flyback interval when the core of $T_{303}$ is fully discharged via flyback diode $GR_{303}$, it is desirable to permit $GR_{301}$ to conduct before the end of this period, and as noted above, this is attainable since $GR_{302}$ may be cut off before flyback terminates. However, with flyback current flow and conduction of $GR_{301}$ occurring concurrently, there is the danger that a voltage in $W_1$ of $T_{303}$ caused by flyback current in $W_2$ will produce an excessive circulating current. This is prevented, however, because $GR_{312}$ is rendered non-conductive as soon as $GR_{302}$ switches on. When the latter occurs, the increment across $W_2$ of $T_{303}$ (i.e., V−$V_1$) is induced in $W_1$ of $T_{303}$ such that the net voltage back-biases $GR_{312}$.

The sampling action in which output voltage and voltage $V_1$ are compared is based upon an assumed line voltage. Preferably this is selected to be the lower limit of line voltage variation. Any increase in line voltage above this value is compensated by the addition to the sampling network of a compensating network comprising $C_{309}$ and $R_{306}$. These elements are serially connected via a zener diode $DZ_{303}$, between the cathode of $GR_{301}$ and the junction of $R_{315}$ and $R_{331}$ in the comparator circuit. The zener diode breaks down when line voltage rises above the minimum value. When this occurs an incremental voltage is added across $R_{331}$ and this voltage tends to cancel the effect of the voltage increment appearing across $R_{313}$ due to the change in line voltage.

Under the initial conditions, with the output voltage close to zero, the turn-on of the supply causes stage $Q_{308}$ to be forward biased due to the drop across the three serially connected diodes $D_{316}$. With $Q_{308}$ switched on, $GR_{302}$ may be supplied with gate current via trigger transformer $T_{302}$ provided $GR_{301}$ is switched off. This occurs at the peak of the first cycle and hence $GR_{302}$ is switched on at this time. Once an output voltage has been established, the drop across $R_{316}$ cancels the effect of the diodes $D_{316}$ and back-biases $Q_{308}$. Thus, following the initial cycle, $Q_{308}$ is in its normal sampling configuration. The diodes $D_{316}$ insure that this will occur regardless of circuit and system Q conditions.

Included in the power supply of FIGURE 4 is an adjustable current limiting circuit including pnp stages $Q_{301}$ and $Q_{302}$. The emitters of both stages are tied together and connected to $E_{1+}$ via $R_{305}$. The collector of $Q_{302}$ is connected directly, and the base of $Q_{301}$ is connected via variable resistance $R_{302}$, to $E_{1-}$ and the V+ terminal. Resistance $R_{302}$ sets the current limiting level. The base of $Q_{301}$ is also connected to $E_{1+}$ via $R_{303}$.

In the positive output leg of the supply a resistance $R_{308}$ is provided for sensing current variations. Connected across this resistor is a response-varying network comprising in series, $R_{307}$ and $C_{306}$. The base of $Q_{302}$ is connected to the junction of these latter components. The collector of $Q_{301}$ is connected to the base of $Q_{309}$ which as noted hereinbefore, functions to by-pass gate current from $GR_{301}$ after that rectifier is de-energized.

A voltage related to the load current is supplied to the base of $Q_{302}$ via its connection to $R_{307}$ and $R_{308}$. As this voltage increases, corresponding to increasing load current, conduction through $Q_{302}$ decreases, the stage being otherwise forwardly biased from source, $E_{1+}$, $E_{1-}$. When the current limiting level is reached, $Q_{302}$ is cut off while $Q_{301}$ is switched *on* due to the decreased voltage across the common emitter resistance $R_{305}$. When $Q_{301}$ conducts, base current is supplied to $Q_{309}$ causing the latter to conduct. When this occurs all gate triggers to $GR_{301}$ are by-passed through the shunt circuit comprising the collector-emitter of $Q_{309}$. Hence, $GR_{301}$ is prevented from firing whereby output current cannot further increase. The current limiting level is adjusted by $R_{302}$ which controls the quiescent base voltage of $Q_{301}$. It may be seen that the effect of the current limiter is to reduce output voltage in the presence of a load which tends to draw excessive current; hence, a constant current characteristic automatically supersedes the constant voltage characteristic when the current maximum is reached.

FIGURE 5

The circuit of FIGURE 5 embodies a number of unique control characteristics which, in addition to extending the degree of regulation which is attainable, also eliminates adverse effects associated with the dissipative component of the output filters, and eliminates the need for special compensating networks for line voltage and turn-on conditions. In addition to the foregoing, the control features in the circuit of FIGURE 5 yield certain simplifications in the main feedback control circuit to the input controlled rectifier.

The power transfer circuits of FIGURE 5 resemble in general those of the preceding figures. However, control arrangements for the rectifiers $GR_{401}$ and $GR_{402}$ vary from those previously described.

The feedback control circuit to $GR_{401}$ includes an input npn stage $Q_{403}$ which samples output voltage and like its counterparts in previously described circuits, compares a potential related to output voltage with a reference potential $E_{12}$–$E_{13}$. The base of $Q_{403}$ is connected via $D_{409}$ to the reference junction of variable resistance $R_{450}$ and fixed resistance $R_{451}$. These components form the output divider together with $R_{452}$ (variable) and reference potential source $E_{12}$–$E_{13}$. (The reference potential points are connected to an auxiliary source not shown which provides in order of decreasing potential, voltages at $E_{10}$, $E_{12}$, $E_{13}$, and $E_{14}$.)

The base of $Q_{403}$ is also connected via $R_{453}$ to the output divider at the junction of $R_{452}$ and $E_{12}$. The emitter of $Q_{403}$ is connected to V+. Hence, a decrease in output voltage from the nominal value established by $E_{13}$–$E_{12}$ and the divider resistance, causes $Q_{403}$ to become conductive and current flows from the potential point $E_{10}$ through a resistance $R_{454}$ to the collector and thence to the emitter and potential point $E_{13}$ (which is also V+).

The drop in collector potential accompanying the conduction of $Q_{403}$ is coupled via resistance $R_{410}$ to the base of npn stage $Q_{409}$. The latter has its emitter connected to $V_{1+}$ and via $R_{408}$ to $E_{13(V+)}$; its base is also connected to the junction of diode $D_{410}$ and capacitance $C_{404}$ via a resistance $R_{420}$ and diode $D_{431}$. $D_{410}$ and $C_{404}$ are serially connected across $C_{402}$, and are therefore energized by $V_1$. The drop in base potential of $Q_{409}$ cuts this stage off. Prior to this cut-off, $Q_{409}$ served to shunt the base-emitter circuit of npn stage $Q_{404}$ thereby keeping $Q_{404}$ cut-off.

It may be seen that the emitter-collector circuit of $Q_{409}$ is in shunt with the series combination of the base-emitter of $Q_{404}$ and resistance $R_{419}$. This combination is connected at the base side to zener diode $DZ_{401}$ via resistance $R_{427}$ and at the distal terminal of $R_{419}$ to $V_{1+}$. As in earlier embodiments, a sufficient difference between $V_s$ and $V_1$ energizes $DZ_{401}$. However, turn-on base current will not flow in $Q_{404}$ so long as the base is by-passed by $Q_{409}$ as previously noted. When, however, $Q_{409}$ is cut-off by the correction signal from $Q_{403}$, then the by-pass or shunt circuit is effectively opened and $Q_{404}$ is switched to the conductive state. Gate current is then supplied to $GR_{401}$ from $E_{10}$ through $R_{411}$ and the emitter-collector of $Q_{404}$. Hence, a drop in output potential sufficient to trigger $Q_{403}$ causes cut-off of $Q_{409}$, conduction of $Q_{404}$ and energization of $GR_{401}$. A power transfer cycle is thereby initiated as previously described. The drop across $D_{410}$ associated with conduction of $GR_{401}$ acts as in the other embodiments to keep $Q_{407}$ in the control circuit of $GR_{402}$ in the cut-off state. Hence conduction of $GR_{402}$ is prevented.

When $GR_{401}$ has charged $C_{402}$ to the peak value of $V_1$, current through $D_{410}$ drops, thereby permitting conduction of $Q_{407}$, whereby the control circuit of $GR_{402}$ is no longer disabled. In addition, $C_{404}$ discharges through $D_{431}$, $R_{420}$, the base-emiter of $Q_{409}$, and the divider $R_{413}$, $R_{429}$ whereby $Q_{409}$ is switched *on* to short-circuit the base of $Q_{404}$ and thus disable the control circuit of $GR_{401}$.

In computing the proper point of conduction of $GR_{402}$, the available energy level measured in terms of $V_1$, is sampled by virtue of the connection of the base of $Q_{408}$ to the divider $R_{413}$, $R_{429}$. The emitter on the other hand is connected to a circuit which is responsive to the average error signal as described below.

Connected across the portion $R_{451}$, $R_{452}$, $E_{12}$–$E_{13}$ of the output divider is an averaging or integrating network comprising $R_{458}$ and $C_{420}$ in series. The average error appearing across $C_{420}$ is applied to a differential amplifier comprising pnp stages $Q_{410}$, $Q_{411}$. The emitters of these stages are connected to $E_{10}$ via $R_{456}$. The collector of $Q_{410}$ is connected to $E_{14}$ while the output is taken from the collector of $Q_{411}$ and applied to the base of an npn stage $Q_{412}$.

The base of $Q_{411}$ is connected to V+ via resistance $R_{455}$ while the base of $Q_{410}$ is connected thereto via $R_{457}$ and $C_{420}$ whereby the average error across $C_{420}$ unbalances the amplifier. The differential output is reflected in the base-emitter current in $Q_{412}$, the emitter of which is returned to $E_{14}$. The amplified output from the collector of $Q_{412}$ is applied to the series combination of $R_{463}$ and $C_{409}$, the latter having its remote terminal connected to V+ via current sensing resistance $R_{408}$; the colector of $Q_{412}$ is also connected directly to the emitter of $Q_{408}$. As previously noted, the base of this stage samples $V_1$ via connection to sampling divider $R_{413}$, $R_{429}$.

$Q_{408}$ thus compares $V_1$ with the average error and when they are in desired relation $Q_{408}$ conducts. As in previous embodiments this causes conduction of a pair of stages, $Q_{406}$ and $Q_{407}$ in the instant embodiment, whereby current flows in $W_2$ of transformer $T_{402}$. The resultant voltage induced in $W_1$ of $T_{402}$ energizes $GR_{402}$ whereby the circuit energy, now at the desired level, is delivered to the output circuit as previously described. Current limiting is accomplished with a pair of stages $Q_{401}$, $Q_{402}$ similar to those of FIGURE 4. However, the output of the current limiter is applied to the base of $Q_{411}$ to illustrate an alternate connection. At the point of maximum current, $Q_{402}$ is in saturation and $Q_{401}$ cut-off. $Q_{411}$ is therefore cut-off, disabling the control circuit of $GR_{402}$ and preventing delivery of excessive output current. While in other respects FIGURE 5 is generally similar to FIGURE 4, it may be noted that the line compensation circuit ($DQ_{303}$, etc., FIGURE 4) and start circuit associated with $Q_{308}$ ($D_{316}$, etc., FIGURE 4) are not required.

In the study and practice of the invention, modifications will undoubtedly occur to those skilled in the art. The invention is accordingly not limited to the specific mechanisms shown and described, but departures may be made therefrom within the scope of the accompanying claims, without sacrificing the chief advantages.

What is claimed is:

1. A regulated DC power supply comprising a source of DC power, a power transfer circuit connected thereto, said power transfer circuit comprising an oscillatory self-commutating circuit including a controlled rectifier and load-supplying capacitance charged from said source via said controlled rectifier, and an isolating circuit, said oscillatory circuit being arranged to provide a self-commutating characteristic driving cut-off current through said controlled rectifier automatically without intervention of regulating actions; a DC output circuit; said isolating circuit including a filter connected to said output circuit for filtering the charge of said capacitance to supply said output circuit, and controlled power-carrying switch means connected to controllably transfer charge of said capacitance to said filter; and regulating means connected between said output circuit and said power transfer circuit for controlling said power transfer circuit to provide a regulated DC output.

2. A power supply a defined in claim 1 in which said power carrying switch means comprise a controlled rectifier, and in which said supply also includes coordinate control means for coordinating the conduction of said controlled rectifiers whereby they conduct successively.

3. A power supply as defined in claim 1 in which said isolating circuit is connected across said capacitance and includes inductance and discharge means whereby during one operating cycle substantially all of said charge of said capacitance may be transferred to said filter.

4. A power supply as defined in claim 1 in which said regulating means are operatively connected to said controlled rectifier of said power transfer circuit for controlling the switching of same.

5. A power supply as defined in claim 4 including co-ordinating control means for switching on said power carrying switch means in response to cut-off of said controlled rectifier.

6. A power supply as defined in claim 1 in which said regulating means are directly connected to said power carrying switch means for controlling the switching thereof.

7. A power supply as defined in claim 6 including control means responsive to the cut-off of said power carrying switch means for causing conduction of said controlled rectifier to thereby recharge said capacitance.

8. A power supply as defined in claim 1 in which said isolating circuit has an underdamped characteristic.

9. A power supply as defined in claim 1 in which said power transfer circuit includes means for varying the charging of said capacitance as a function of said output to thereby match the amount of energy transferred per cycle to output requirements.

10. A power supply as defined in claim 9 including flowback means for returning a controlled amount of stored energy in said power transfer circuit to said source.

11. A power supply as defined in claim 10 including a control circuit for generating a signal dependent upon the relationship between said output and said charge for actuating said power carrying switch means and for disabling said flowback means when said stored energy is at the required level.

12. A power supply as defined in claim 9 including transformation means coupled between said power transfer circuit and said output circuit for controllably transferring stored inductive energy to said output circuit.

13. A regulated DC supply comprising a source of relatively unregulated voltage, an output circuit for supplying a regulated DC output, first and second controlled rectifier circuits in cascade between said source and said output circuit, each including controlled rectifier means and underdamped cut-off means for causing automatic cut-off of the respective controlled rectifier means, said first circuit controlled rectifier means being effectively connected in isolated relationship with respect to said output circuit; feedback control circuit means operatively connecting said output circuit and said rectifier circuits and having actuating means for rendering said rectifier circuits successively conductive as a function of the condition of said DC output whereby regulation is attained.

14. A power supply as defined in claim 13 in which said feedback control circuit means are connected to said second controlled rectifier means for switching same into conduction when said output falls below a reference value.

15. A power supply as defined in claim 13 in which said feedback control circuit means are connected to said first circuit controlled rectifier means for switching same into conduction when said output falls below a reference value.

16. A power supply as defined in claim 13 in which for a given source condition, said first controlled rectifier circuit delivers a substantially fixed amplitude, fixed period pulse to said second controlled rectifier circuit and in which the period between said pulses is controlled by said feedback control circuit means.

17. A power supply as defined in claim 13 in which said first controlled rectifier circuit includes means for storing time-varying energy initiated by said feedback control circuit means, and said second controlled rectifier circuit includes means responsive to said output for transferring said energy to said output circuit when it attains a required level.

18. A power supply as defined in claim 17 in which said first controlled rectifier circuit includes means providing a controlled flowback of energy from said first controlled rectifier circuit to said source to thereby develop said time-varying energy.

19. A power supply as defined in claim 17 including computing means responsive to the level of said stored energy and to said output, and trigger means responsive to said computing means for actuating said second controlled rectifier means.

20. A power supply as defined in claim 17 including computing means responsive to the average deviation of said output for controlling said second controlled rectifier circuit.

21. A regulated DC supply comprising a source of relatively unregulated voltage, an output circuit for supplying a regulated DC output, first and second switching circuits in cascade between said source and said output circuit, each including controlled switch means and underdamped cut-off means for causing automatic cut-off of the respective controlled switch means, said first circuit controlled switch means being effectively connected in isolated relationship with respect to said output circuit; feedback control circuit means operatively connecting said output circuit and said switching circuits and having actuating means for rendering said switching circuits successively conductive as a function of the condition of said DC output whereby regulation is attained.

22. A supply as defined in claim 21 in which said feedback control circuit means includes repetition rate control means for controlling the pulse repetition frequency of said supply and further control means for controlling pulse energy content.

23. A supply as defined in claim 22 in which said first switching circuit includes means responsive to said further control means for returning controlled amounts of energy to said source.

24. A regulated DC supply comprising a source of relatively unregulated potential, a power storage circuit energized from said source and having means for recurrently storing energy and for returning controlled amounts of said energy to said source for developing a pulse of energy having a time-varying amplitude, an output circuit for delivering a regulated DC output, a power transfer circuit connected between the output of said power storage circuit and said output circuit for controllably transferring a selected amount of said energy to said output circuit, and a feedback control circuit connected to said power transfer circuit and having means for controlling the start of energy transfer through said transfer circuit as a function of output conditions to thereby deliver a controlled amount of energy to said output.

25. A supply as defined in claim 24 including further feedback means connected to said power storage circuit for controlling the initiation of energy storage therein as a function of said output.

26. A power supply as defined in claim 24 in which said storage circuit includes inductance and capacitance for said storing of energy.

27. A supply as defined in claim 24 in which said first power transfer circuit comprises an oscillatory circuit.

28. A supply as defined in claim 24 in which said source comprises a filtered DC source and said first power transfer circuit includes switch means and self-commutating means.

29. A supply as defined in claim 24 in which said feedback control circuit includes control means for monitoring the instantaneous magnitude of said stored energy relative to said DC output.

30. A power supply as defined in claim 29 in which said control means generates a signal variable as a function of average output error.

31. A power supply as defined in claim 24 in which said power transfer circuit comprises isolating means for rendering said storage circuit load insensitive.

32. A power supply as defined in claim 24 in which said storage circuit includes capacitance for storing said energy and for rendering said storage circuit self-commutative.

33. A power supply as defined in claim 32 in which said storage circuit includes inductance for storing said energy and transformer means connected to said output circuit for controllably transferring energy stored in said inductance to said output.

34. A regulated DC supply comprising a source of relatively unregulated DC potential, a power storage circuit energized by said source and having means for recurrently storing energy from said source and essentially dissipationless means for varying said stored energy during each recurrent period, an output circuit for delivering a regulated DC output, a first feedback control circuit interconnecting said power storage circuit and said output circuit for controlling the start of said energy storage, a power transfer circuit connected between the output of said power storage circuit and said output circuit for controllably transferring the selected stored energy to said output circuit, and a second feedback control circuit connected between said output circuit and said interconnected power circuits and having transfer control means for developing a signal related to conditions in said output circuit for controlling the start of transmission through said power transfer circuit to thereby control the energy content of the pulse transferred to said output.

35. A power supply as defined in claim 34 in which said power storage and power transfer circuits each include inductance, the inductance in said storage circuit being operable to render said storage circuit underdamped for causing automatic cut-off thereof.

36. A power supply as defined in claim 34 in which said power transfer circuit includes filter means having capacitance which is also operable to cause automatic cut-off of said transfer circuit.

37. A power supply as defined in claim 34 including interlock means connected between said storage and transfer circuits for preventing conduction in said storage circuit during conduction in said transfer circuit.

38. A power supply as defined in claim 34 in which said output circuit includes regulator means having controlled impedance, said first feedback control circuit being responsive to the voltage across said impedance.

39. A power supply as defined in claim 34 in which said transfer circuit includes inductance means connected to transfer substantially all of the accessible stored energy in said storage circuit through said transfer circuit.

40. A power supply as defined in claim 34 in which said power storage circuit comprises the series combination of a controlled rectifier, inductance and capacitance connected across said source of potential, and in which said transfer circuit is connected across said capacitance and comprises the series combination of a second controlled rectifier, second inductance and second capacitance.

41. A power supply as defined in claim 40 including coordinating means interconnected between said storage and transfer circuits for preventing concurrent conduction of said first and second controlled rectifiers.

42. A power supply as defined in claim 40 in which said first feedback control circuit is connected to said first controlled rectifier and said second feedback control circuit is connected to said second controlled rectifier.

43. A power supply as defined in claim 40 including energizing control means connected to said first controlled rectifier for preventing switching thereof in the event said unregulated DC potential is at an improper value.

44. A power supply as defined in claim 40 including a first coordinating transistor stage connected between said first controlled rectifier and said power transfer circuit for interlocking the operation of said first controlled rectifier, and a second coordinating transistor stage connected to said second controlled rectifier and said storage circuit for interlocking the operation of said second controlled rectifier.

45. A regulated DC power supply comprising a source of DC power, a controlled power circuit connected thereto, said power circuit comprising an oscillatory self-commutating circuit including inductance, a controlled electronic switch, a load-supplying storage capacitance charged from said source via said controlled switch and means for gradually returning stored circuit energy to said source, said inductance and storage capacitance being connected to said electronic switch and having underdamping values for causing current reversal in said oscillating circuit to automatically cut off said switch; a DC output circuit; a transfer circuit connected to said output circuit for controllably transferring residual energy of said capacitance to said output circuit, and regulating means connected between said output circuit and said power circuit for controlling said power circuit to provide a regulated DC output.

46. A power supply as defined in claim 45 including transforming means for transferring energy stored in said inductance to said output circuit.

47. A power supply as defined in claim 45 in which said regulating means include a first feedback circuit responsive to said output for actuating said switch and a second feedback circuit responsive to said output and to the magnitude of stored energy for actuating said transfer circuit when said stored energy and output conditions are in proper relationship.

48. A power supply as defined in claim 45 in which said transfer circuit comprises isolating means for imparting to said oscillatory circuit a load-insensitive characteristic.

49. A power supply as defined in claim 45 in which said transfer circuit comprises an oscillatory, self-commutating switching circuit.

50. A power supply as defined in claim 45 in which said return means comprise asymmetrically conductive rectifier means connected in shunt with said electronic switch.

51. An electronic switching type DC power supply comprising a DC source, an under-damped series tuned circuit connected to said source and including a first inductance, a first capacitance for storing energy to be delivered to a load and a first controlled rectifier, all connected in series, the values of said first inductance and first capacitance being selected to cause self-commutation of said first controlled rectifier; an isolating circuit connected to receive energy from said first capacitance and including a self-commutating circuit having a second capacitance and second controlled rectifier, said second controlled rectifier being in series relationship relative to said first and second capacitances for controllably transferring charge from said first capacitance to said second capacitance; and an output circuit operatively connected to said second capacitance for supplying direct current to a load.

52. A power supply as defined in claim 51 including pulse generating means for firing said first and second controlled rectifiers, said pulse generating means having interconnecting means for synchronizing the operation of said first and second controlled rectifiers and operable to cause them to conduct successively.

53. A power supply as defined in claim 51 in which said isolating circuit comprises the series combination of inductance and said second capacitance and second controlled rectifier, said combination being effectively connected across said first capacitance.

References Cited
UNITED STATES PATENTS

| | | | |
|---|---|---|---|
| 3,273,043 | 9/1966 | Clarke | 321—18 |
| 3,273,044 | 9/1966 | Clarke | 321—18 |

JOHN F. COUCH, *Primary Examiner.*

K. D. MOORE, M. L. WACHTELL, *Assistant Examiners.*